Aug. 11, 1964  H. HARRISON ETAL  3,144,241

EGG BEATER

Filed May 8, 1962  2 Sheets-Sheet 1

INVENTORS
H. C. HARRISON
H. HARRISON
By Cushman, Darby & Cushman
ATTORNEYS

Aug. 11, 1964  H. HARRISON ETAL  3,144,241
EGG BEATER

Filed May 8, 1962  2 Sheets-Sheet 2

INVENTORS
H. C. HARRISON
H. HARRISON
By Cushman, Darby & Cushman
ATTORNEYS

United States Patent Office 3,144,241
Patented Aug. 11, 1964

3,144,241
EGG BEATER
Henry Harrison, Frost Creek Drive, Locust Valley, N.Y.,
and Henry C. Harrison, 94 Bayview Ave., Port Washington, N.Y.
Filed May 8, 1962, Ser. No. 193,119
20 Claims. (Cl. 259—128)

This invention relates generally to one-hand egg beaters and the like, and has particular reference to a new and improved beater means.

The term "egg beaters" is utilized herein to refer to a kitchen tool, of the well known type which is commonly utilized to beat, whip, blend, fold and otherwise mix various foods in a container. While egg beaters of this character are long known in the art, such prior apparatus generally contemplates the provision of beaters formed in the shape of cages, having a plurality of radially spaced sheet metal blades with an enlarged bulbous lower portion defining thereby a solid of revolution. In instances where such beaters are used with electrically powered motor means generally two such beaters are provided, the blades each being connected to a fixed vertical drive shaft and adapted for intermeshing engagement with one another.

Egg beaters of this general character also include constructions having a single, helically formed, spring-loaded shaft, driven by carrying the associated handle in one hand and moving the same up and down. Such one-hand beaters have enjoyed varying degrees of commercial reception. As with the former type of egg beater, the conventional construction for a one-hand beater generally includes the provision of the radially spaced blades formed in a rigid cage, rotatably driven by the shaft.

Such prior art one-hand beaters are not without significant shortcomings, being slow and ineffective in operation. The beater portion of such prior art constructions depends for its mixing effectiveness on producing high local accelerations within the body of the material to be mixed. Such high local accelerations, which fragment lumps and gel particles, result from substantial differences in speed between the beater and the mix. Conventional manual one-handed egg beaters, by reason of limitations of their driving mechanism, have rather low rotational speeds and accelerations.

Another factor which reduces the effectiveness of beaters of this character is the centrifugal escape of the material to be mixed. A single rigid cage, frame, paddle or blade rotating about a drive shaft in a mix tends to throw the mix outwardly beyond the region of engagement with the beater. Changes to increase the beating effectiveness of such a rigid beater generally increase the coupling of the beater with the mix, and thus defeat their purpose by augmenting this centrifugal effect, thereby causing dispersion of the mix from the beater.

Further, such prior art beaters are unable to completely circulate the mix, so there are portions of the mix which are seldom or never brought into the zone of action of the beater. This is particularly noticeable in beating egg whites, when the stiff portions of the mix impede circulation. Also, such beaters are unable to positively crush lumps. Slow-speed beaters do not have the impact necessary to break up gravy lumps, for example, and have no provision for rubbing or crushing the same. The difficulty in cleaning the inside cage area of the beater is believed to be self-evident.

According to this invention, there is provided a one-handed egg beater having beating means of new and improved construction, providing a notably efficient mixing action with a minimum of effort to operate the same. The egg beater according to this invention reduces the tendencies of the liquid to splash compared with the case of beaters which create a high centrifugal force, tending to form a vortex in the liquid.

This invention contemplates the provision of a beater having a shaft to which is imparted a rotating motion in a conventional manner, the shaft carrying at its opposite, lower end a plurality of transversely extending, radially spaced, freely rotatable mixing wheels. In the preferred embodiment of this invention, the wheels are unsymmetrically disposed on a carrier relative to vertical shaft axis with the wheel axes being upwardly inclined relative to the horizontal. The wheels carry longitudinally extending mixing fingers about their outside end surfaces. By virtue of this arrangement, rapid and effective beating is accomplished: the tendency to create a vortex in the fluid being mixed is minimized, splashing is likewise reduced, and the mixing wheels will roll easily in the bottom of a small cup as well as on a flat bottom surface of a large pan to crush and comminutate the food particles therebetween. Further, the one-hand beater according to this invention is easily cleaned, and is operative with a minimum of manual exertion.

Accordingly, still another feature of the present invention is the provision of an egg beater of the character described which includes a loosely fitted joint between the drive shaft and the carriage which carries the wheels as described. This arrangement allows the carriage to rock and otherwise follow normal irregularities of the container surface. Preferably, the carriage is allowed to tilt relative to the axis of the drive shaft at least in one direction an appreciable amount so that the egg beater carriage can be folded with respect to the drive shaft to occupy a minimum of storage space when not in use.

Still further according to this invention there is provided an egg beater having a drive shaft, means for imparting rotary movement to this drive shaft, together with a wheel-carrying carriage at the lower free end thereof for mixing and whipping food. The carriage has depending paddles extending therefrom.

Still other important objects of this inveniton are to provide a one-handed egg beater which is substantially free from undesirable splashing tendencies; is small enough to fit in an ordinary small cup; folds compactly for storage in a drawer or attachment to a scales card; is of meritoriously simple but rugged and durable design, capable of manufacture by mass production techniques at a minimum of expense.

These and still further objects, advantages and novel features of the present invention will become apparent in the specification and claims, taken in connection with the accompanying drawings.

Referring now to the drawings.

Figure 1:
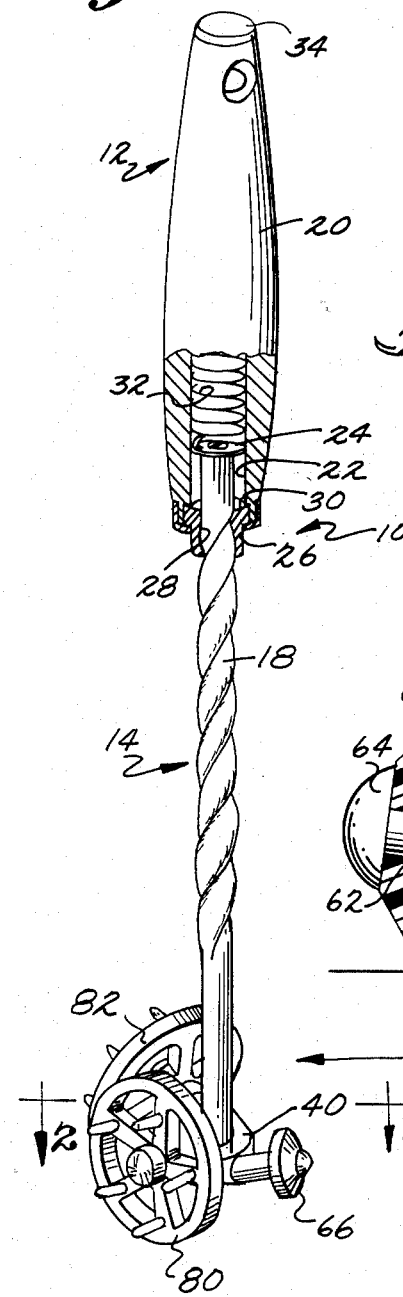
FIGURE 1 is a perspective view of an egg beater according to this invention.

Referring now to FIGURES 1–4, there is shown an egg beater 10 having a reciprocatory drive handle portion 12 receiving a rotatable drive shaft 14. The drive shaft 14, in turn, carries a beating means at its opposite free end according to this invention. The shaft 14 is helically or spirally formed about the major portion 18 of its upper length. The handle portion 12 includes an upper gripping handle 20 having a longitudinal bore 22 which receives the upper end 18 of the shaft 14.

This upper shaft end 18 has joined thereto a washer 24 slidably carried in the handle bore 22. The lower end of the gripping handle 20 carries a fixed driving disc 26 having a central passage 28 cooperatively formed to impart a rotating motion to the shaft 14 in the usual manner. The driving disc 26 has an upper shoulder 30 for limiting downward movement of the shaft washer 24. A helical compression spring 32 is carried in the handle bore 22 above the washer 24, the spring 32 being retained within the handle bore 22 by a cap 34 which is joined to the upper end of the gripping handle 20. This type of drive is known in the art, the person imparting a rotary motion to the drive shaft 14 when the latter is operatively engaged with the container surface simply by moving the handle 20 downwardly so that the longitudinal movement imparts a rotary movement to the drive shaft 14 via the handle drivng disc 26. Upon release of the beater 10 from the bottom surface, the spring 32 biases the shaft 14 downarwdly so that the reciprocatory-rotary movement can be repeated.

The present invention specifically resides in the beating means 16, as will now be explained. The drive shaft 14 has a longitudinally extending flat lower surface 36 terminating at its upper end with a transverse shoulder 38. The lower end of the shaft 14 receives a carriage 40 through a generally rectangular opening 42 in plan (FIGURE 2) for appropriate transmission of the rotary motion therebetween. The upper surface of the carriage 40 abuts the shoulder 38 to limit the movement thereof. The drive shaft 14 thereby fits loosely in the opening 42 to allow the carriage to tilt a small degree in any direction.

Figure 3:
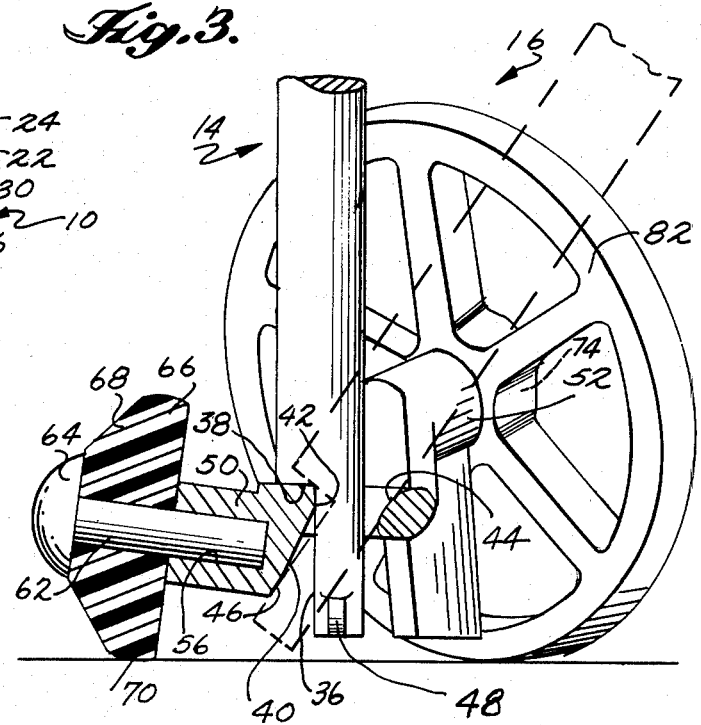
FIGURE 3 is an elevation section view taken substantially along line 3—3 in FIGURE 2.

In this regard, the rectangular carriage opening 42 has a wall 44 opposite to the flat shaft surface 36, which wall is normally inclined with respect to the longitudinal axis of the drive shaft 14. The opposite wall 46 adjacent the flat surface 36 which wall is likewise inclined with respect to the longitudinal axis of the drive shaft 14 so as to allow the carriage 38 to be tilted through an appreciable angle at least in one direction. In this regard, the lower extremity of the wall 44 limits tilting of the shaft 14 in the opposite direction, as best shown in FIGURE 3. The drive shaft 14 is permanently secured to the carriage 38 by any suitable means, such as flattened-out, opposed, transversely extending lugs 48.

Figure 2:
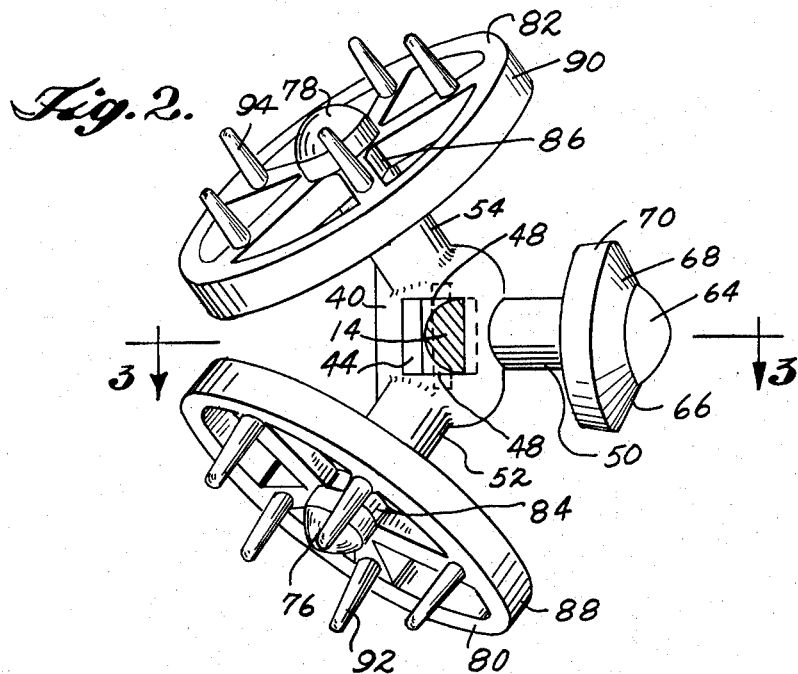
FIGURE 2 is a section view in plan, taken substantially along line 2—2 in FIGURE 1.
Figure 4:
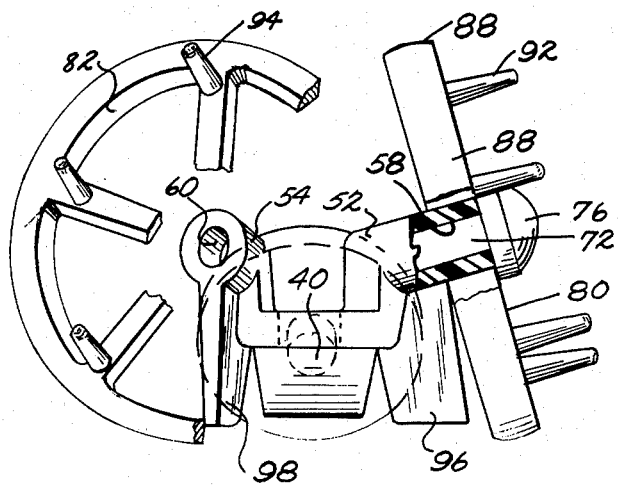
FIGURE 4 is a side elevation view, partially broken out, taken parallel to the axis of one of the wheels.

The carriage has integrally formed therewith three extending bosses 50, 52, 54, radially positioned with respect to one another as will now be explained. These bosses 50, 52, 54 are upwardly inclined with respect to the horizontal, having pin receiving holes 56, 58 and 60, which holes likewise have axes upwardly inclined with respect to the horizontal, and extending in generally radial direction with respect to the axis of the drive shaft 14. As best shown in FIGURE 2, the bosses preferably are unsymmetrically disposed, both radially and angularly, with respect to the drive shaft 14. Carried within the boss 50 is an axle pin 62 having an enlarged head 64. The pin 62 is joined to the boss 50 in any known manner, such as a friction fit, or the like. Many suitable arrangements for joining the pin 62 to the boss 50 will be apparent to those skilled in the art.

The pin 62 carries a freely rotatable small wheel 66 having a generally conical outer surface 68 and a slightly contoured or crowned circumferential surface 70.

Carried between remaining bosses 52 and 54 are similar pins 72 and 74 having enlarged heads 76 and 78, respectively. Each of the pins 72 and 74 carries relatively large spoked wheels 80, 82 via their respective central hubs 84, 86. The wheels 80, 82 are thereby mounted for free rotation with respect to the carriage 40. The wheels 80, 82 each have a slightly contoured or crowned circumferential surface 88, 90, respectively, for reasons to become apparent. The outer transverse end surface of each of the wheels 80, 82 carries integrally formed, mixing fingers 92, 94, which are spaced radially over the outer transverse end surface of the wheels conveniently being joined to the respective wheel spokes. The mixing fingers 92, 94 are generally conical and have dome-shaped free ends, their axes being generally parallel to the respective axes of wheel rotation.

Integrally joined to the carriage bosses 52 and 54 in depending relationship thereto are paddles 96, 98, respectively, which paddles extend outwardly to a position closely adjacent the inner ends of the respective mixing wheels 88 and 90. The mixing wheels 88 and 90, of course, extend below the paddles 96, 98 so that free rotation thereof is unimpaired when abutting the container surface.

In operation, notably superior mixing is obtained as the result of effective fragmenting of liquids and solids, combined with vigorous stirring which brings fresh portions of the mixture into position for fragmenting, and the like. The beating means 16 is designed to fragment mixes with exceptional effectiveness. Solids and gels are ground, crushed, or cut by the rolling wheels 66, 80, and 82; and, the upper circumferential portions of the spoked wheels 80 and 82, and the associated mixing fingers 92 and 94 whiz through the mix at a faster speed than the carriage 40, fragmenting liquids with high accelerations and tearing gel materials. This cooperative action provides a substantial number of dividing edges sweeping through the mix, producing rapid whipping and mixing in of air. Stiff materials such as partially beaten egg white, which would otherwise stand clear of the mixing action, are beat by the mixing fingers 92 and 94.

Likewise, the beating means 16 produces countercurrents which give very high velocity gradients and very vigorous stirring in the mix without excessive centrifugal force. The unsymmetrical arrangement of wheels promotes superior circulation by giving the mix maximum time to fall into the region where it will be acted on by the spoked mixing wheels 80 and 82. Material which might lie untreated within the rolling circle of the wheels is swept outwardly of the carriage paddles 96 and 98. It has been found that those droplets which are flung by the rims and raking points of the wheels travel horizontally and are thereby trapped within the bowl, thus minimizing splashing tendencies.

In comparison with conventional one-hand beaters, such as those constructed with a cage of sheetmetal strips, the present egg beater 10 has a minimum of surface area, but is readily accessible for cleaning. Even the joint between the stem and the carriage is readily cleaned by sliding the carriage up and down the shaft surface 36.

The preferred size of this beater 10 is chosen to minimize flinging or splashing, and it happens that this size is also compact enough to fit a small cup. The wheels, being slanted from the vertical plane, roll easily in the bottom of a cup as well as on a flat bottom surface. The contoured circumferential surfaces 70, 88 and 90 of the wheels give reasonable contact over the common range of bottom curvatures.

The loosely fitted joint between the shaft 14 and the carriage 40 permits the carriage to rock while rolling over any normal irregular bottom surface. In addition, sufficient freedom in one direction may be provided so that the shaft 14 can tilt about 35 degrees relative to the carriage 40. This allows folding of the egg beater so that the same occupies a minimum volume of space, yet it is ready for instant use without special adjustment or manipulation.

The beating means 16 of this beater 10 has a radius of gyration substantially less than conventional beaters, and a mass very much less, so its moment of inertia is considerably reduced. Accordingly, less force is required to drive the same, and less compression spring force is required to return the shaft 14 while holding it in contact with the mixing bowl. These factors result in less work and effort required of the user in the rapid oscillation of the beater.

The wheels 66, 80 and 82 can be conveniently molded of nylon or other suitable heat and food acid resistant plastic, while the pins are advantageously constructed of stainless steel or the like. The carriage is conveniently designed, for example, as an aluminum die casting.

From the foregoing description of the preferred embodiment of this invention, it is evident that the objects of this invention, together with many practical advantages are successfully achieved. While the preferred embodiment of our invention has been described, numerous further modifications may be made without departing from the scope of this invention.

Therefore, it is to be understood that all matters herein set forth or shown in the accompanying drawings, are to be interpreted in an illustrative, and not in a limiting sense.

What is claimed is:

1. Apparatus of the character described for beating, mixing, and the like comprising: a drive shaft, carriage means at one free end of said shaft; a plurality of mixing wheels rotatably joined to said carriage means in transverse relationship to the axis of said drive shaft, whereby rotation of said drive shaft rotates said carriage means and said wheels about the shaft axis, and said wheels are operative for rolling rotation about their respective axes when abutting a container surface or the like at least one of said wheels carrying a plurality of spaced mixing fingers extending generally longitudinally from one transverse end surface thereof, and handle means operatively joined to the opposite end of said drive shaft for imparting rotation thereto.

2. Apparatus as defined in claim 1 additionally comprising paddle means secured subjacent the carriage and disposed within the circle described by the rotation of said wheels, whereby material is swept from within said circle into the path of the mixing wheels during the rotation of the shaft, carriage and wheels.

3. Apparatus defined in claim 2 wherein said paddle means includes a plurality of spaced paddle plates depending from said carriage means in fixed relationship thereto and terminate at their outer ends adjacent said mixing wheels.

4. Apparatus defined in claim 1 wherein said wheels are of spoked construction and said mixing fingers extend outwardly from said spokes.

5. Apparatus defined in claim 1 wherein said mixing fingers are conically shaped at the base thereof, being joined to the outer surface of said mixing wheels.

6. Apparatus defined in claim 1 including means for mounting said carriage means in tiltable relationship with respect to said drive shaft.

7. Apparatus defined in claim 6 wherein said carriage means is tiltable in one direction only with respect to said drive shaft.

8. Apparatus defined in claim 1 wherein the axis of said mixing wheels are inclined away from the adjacent free end of said shaft means.

9. Apparatus of the character described for beating, mixing, and the like comprising: a drive shaft, carriage means at one free end of said shaft; at least three mixing wheels rotatably joined to said carriage means in transverse relationship to the axis of said drive shaft, whereby rotation of said drive shaft rotates said carriage means and said wheels about the shaft axis, one of said mixing wheels being substantially smaller than the other two mixing wheels, said other two wheels including mixing fingers extending longitudinally from the respective transverse end surfaces thereof in radially spaced relationship, and said wheels are operative for rolling rotation about their respective axes when abutting a container surface or the like, and handle means operatively joined to the opposite end of said drive shaft for imparting rotation thereto.

10. Apparatus defined in claim 1 wherein said wheels are unsymmetrically disposed with respect to the axis of said drive shaft, whereby the effective arcuate distance between adjacent wheels is not constant for all the wheels.

11. Apparatus defined in claim 1 wherein said shaft means is of helical exterior configuration, and said handle drive means includes a handle drivingly joined to drive shaft adjacent the helical exterior surface and spring means carried longitudinally between said handle and said drive shaft whereby reciprocatory movement of said handle relative to said drive shaft provides a rotation of the latter.

12. Apparatus defined in claim 1 including means providing limited longitudinal movement of said carriage means with respect to said drive shaft at the juncture of the carriage and the shaft.

13. Apparatus defined in claim 1 wherein said wheels are of crowned configuration along their circumferential surfaces.

14. Apparatus of the character described for beating, mixing, and the like comprising: a helical drive shaft; handle means at one end of said drive shaft for imparting rotary motion to said drive shaft upon reciprocatory movement of said handle means relative thereto; carriage means drivingly and tiltably joined to said drive shaft at the other free end thereof; three circumferentially crowned mixing wheels rotatably joined to said carriage means in generally radially extending transverse relationship to the axis of said drive shaft; two of said wheels being relatively large and of spoked construction, and including a plurality of outwardly extending mixing fingers integrally joined to said spoked wheels at the outer end surface thereof in radially spaced relationship, the third wheel being relatively small as compared to said spoked wheels, the axes of rotation of said wheels being upwardly inclined with respect to the adjacent free end of said drive shaft, whereby rotation of said drive shaft rotates said carriage means and said wheels about the shaft axis, and said wheels are operative for free rotation about the respective axes when abutting a container surface or the like.

15. Apparatus defined in claim 14 including at least one paddle integrally depending from said carriage means in generally radial relationship to the axis of said drive shaft.

16. Apparatus as defined in claim 9 additionally comprising paddle means secured subjacent the carriage and disposed within the circle described by the rotation of said wheels, whereby material is swept from within said circle into the path of the mixing wheels during the rotation of the shaft, carriage and wheels.

17. Apparatus defined in claim 16 wherein said paddle means includes a plurality of spaced paddle plates depending from said carriage means in fixed relationship thereto and terminate at their outer ends adjacent said mixing wheels.

18. Apparatus defined in claim 9 including means for mounting said carirage means in tiltable relationship with respect to said drive shaft.

19. Apparatus defined in claim 9 wherein said wheels are unsymmetrically disposed with respect to the axis of said drive shaft, whereby the effective arcuate distance between adjacent wheels is not constant for all the wheels.

20. Apparatus defined in claim 9 wherein said shaft means is of helical exterior configuration, and said handle drive means includes a handle drivingly joined to drive shaft adjacent the helical exterior surfaces and spring means carried longitudinally between said handle and said drive shaft whereby reciprocatory movement of said handle relative to said drive shaft provides a rotation of the latter.

References Cited in the file of this patent

UNITED STATES PATENTS

| 529,764 | Weeks | Nov. 27, 1894 |
| 876,549 | Hoffman | Jan. 14, 1908 |
| 1,218,623 | Brillhart | Mar. 13, 1917 |

FOREIGN PATENTS

| 123,024 | Australia | Dec. 5, 1946 |
| 797,712 | France | Feb. 17, 1936 |